US009823983B2

(12) United States Patent
Baca

(10) Patent No.: US 9,823,983 B2
(45) Date of Patent: Nov. 21, 2017

(54) ELECTRONIC FAULT DETECTION UNIT

(71) Applicant: David Baca, Roznov Pod Radhostem (CZ)

(72) Inventor: David Baca, Roznov Pod Radhostem (CZ)

(73) Assignee: NXP USA, Inc., Austin, TX (US)

( * ) Notice: Subject to any disclaimer, the term of this patent is extended or adjusted under 35 U.S.C. 154(b) by 116 days.

(21) Appl. No.: 14/496,552

(22) Filed: Sep. 25, 2014

(65) Prior Publication Data
US 2016/0092320 A1    Mar. 31, 2016

(51) Int. Cl.
G06F 11/00 (2006.01)
G06F 11/16 (2006.01)
G06F 11/14 (2006.01)
G06F 11/07 (2006.01)

(52) U.S. Cl.
CPC ...... *G06F 11/1641* (2013.01); *G06F 11/0721* (2013.01); *G06F 11/0757* (2013.01); *G06F 11/1497* (2013.01); *G06F 11/1645* (2013.01)

(58) Field of Classification Search
CPC .. G06F 11/16; G06F 11/1604; G06F 11/1608; G06F 11/1616
See application file for complete search history.

(56) References Cited

U.S. PATENT DOCUMENTS 5,136,704 A    8/1992  Danielsen et al.
5,357,237 A *  10/1994 Bearden ................. G06F 7/485
                                             327/64
5,452,443 A *  9/1995  Oyamada ............ G06F 11/0757
                                             714/10
6,327,668 B1   12/2001 Williams
6,421,790 B1   7/2002  Fruehling et al.
6,640,313 B1   10/2003 Quach
6,907,443 B2   6/2005  Murray
6,928,583 B2   8/2005  Griffin et al.
7,020,798 B2   3/2006  Meng et al.
7,283,409 B1   10/2007 Voogel et al.
(Continued)

FOREIGN PATENT DOCUMENTS

EP       1496435 A1    1/2005
WO    2006032682 A1    3/2006
(Continued)

OTHER PUBLICATIONS

Final Office Action dated Oct. 6, 2014 for U.S. Appl. No. 13/577,072, 27 pages.
(Continued)

*Primary Examiner* — Matt Kim
*Assistant Examiner* — Katherine Lin

(57) ABSTRACT

An electronic fault detection unit is provided that has a first register, a second register, a comparator circuit, and a timer circuit. The first and second register can be written from a first software portion, and a second software portion, respectively. The comparator circuit is arranged to detect that both the first and second register have been written, verify a relationship between first data written to the first register and second data written to the second register, and signal a fault upon said verification failing. The timer circuit is arranged to signal a fault if said verification of the comparator circuit does not occur within a time limit.

20 Claims, 11 Drawing Sheets

(56) References Cited

U.S. PATENT DOCUMENTS

| | | |
|---|---|---|
| 7,308,605 B2 | 12/2007 | Jardine et al. |
| 7,426,656 B2 | 9/2008 | Bernick et al. |
| 7,472,051 B2 | 12/2008 | Mariani et al. |
| 7,827,429 B2 | 11/2010 | Matsumoto |
| 8,650,440 B2 | 2/2014 | Rohleder et al. |
| 8,854,049 B2 * | 10/2014 | Bogenberger ... G01R 31/31701 324/532 |
| 2002/0023202 A1 | 2/2002 | Mukherjee |
| 2005/0080988 A1 * | 4/2005 | Teng .................... G06F 11/106 711/106 |
| 2005/0278588 A1 | 12/2005 | Cohn et al. |
| 2006/0095821 A1 | 5/2006 | Mukherjee et al. |
| 2007/0277023 A1 | 11/2007 | Weiberle et al. |
| 2008/0163016 A1 | 7/2008 | Cohn et al. |
| 2008/0209251 A1 | 8/2008 | Kottke |
| 2008/0229134 A1 | 9/2008 | Bose et al. |
| 2008/0244305 A1 | 10/2008 | Troppmann et al. |
| 2009/0044048 A1 | 2/2009 | Weiberle et al. |
| 2009/0055674 A1 | 2/2009 | Mueller et al. |
| 2009/0125749 A1 | 5/2009 | Weiberle et al. |
| 2009/0164826 A1 | 6/2009 | Kottke |
| 2010/0235558 A1 | 9/2010 | Snead |
| 2011/0066779 A1 | 3/2011 | Bogenberger et al. |
| 2011/0231709 A1 | 9/2011 | Bellocchio et al. |
| 2012/0011407 A1 | 1/2012 | Fuchigami |
| 2012/0173924 A1 * | 7/2012 | Xiao .................... G06F 11/1048 714/15 |
| 2012/0173933 A1 | 7/2012 | Greb et al. |
| 2012/0304024 A1 | 11/2012 | Rohleder et al. |
| 2015/0149815 A1 | 5/2015 | Maity et al. |
| 2015/0293807 A1 | 10/2015 | Ralston et al. |
| 2016/0092392 A1 | 3/2016 | Yong et al. |

FOREIGN PATENT DOCUMENTS

| | | |
|---|---|---|
| WO | 2006045780 A1 | 5/2006 |
| WO | 2006045798 A1 | 5/2006 |
| WO | 2008146091 A1 | 12/2008 |

OTHER PUBLICATIONS

Mukherjee, S.S. et al., "Detailed Design and Evaluation of Redundant Multithreading Alternatives," 29th ISCA 2002, Anchorage, AK, USA: IEEE Computer Society, May 25-29, 2002, 12 pages.

Non-Final Office Action dated May 19, 2014 for U.S. Appl. No. 13/577,072, 28 pages.

Final Office Action dated Jul. 17, 2017 for U.S. Appl. No. 14/646,177, 22 pages.

Notice of Allowance dated Feb. 3, 2015 for U.S. Appl. No. 13/577,072, 21 pages.

Non-Final Office Action dated Jan. 23, 2017 for U.S. Appl. No. 14/646,177, 15 pages.

Hammadi, N. et al. "Fault tolerant constructive algorithm for feed forward neural networks" ISBN 0-8186-8212-4; IEICE Trans. Inf. and Sys., vol. E81-D, No. 1; Jan. 1998; pp. 115-123.

Oh, N. et al.: "Error Detection by Duplicated Instructions in Super-Scalar Processors", IEEE Transaction on Reliability, 2002, vol. 51, No. I, pp. 63-75.

Notice of Allowance dated Sep. 11, 2017 for U.S. Appl. No. 14/646,177, 5 pages.

* cited by examiner

ELECTRONIC FAULT DETECTION UNIT

FIELD OF THE INVENTION

This invention relates to an electronic fault detection unit, a data processing device, an integrated circuit, an electronic fault detection method, and a non-transitory tangible computer readable storage medium.

BACKGROUND OF THE INVENTION

For safety or security relevant applications, etc., fault tolerance is important. In part, fault tolerance may be obtained by detecting faults in hardware and/or software. When a fault has been detected some appropriate response can be taken.

It is known in the art to use two almost identical central processing units (CPUs), one of which operates as the master CPU and the other as the "checker" CPU. Both central processing units execute basically the same program code and receive the same input data. The outputs of the two central processing units are compared to each other in order to identify errors of the master CPU during operation. Doing the reciprocal checking in software is quite complex. Also, monitoring the hard real-time constraints is difficult as software runs in a virtual time. In virtual time, events are partially ordered, but exact timing is often unknown.

For example, two software tasks have implemented a comparator to compare the results of both tasks. If one task or core fails, the other has to detect that. Each task has the real-time constraint that it has to provide the other task with the value for comparison within the required time window. These real-time constraints need also to be monitored.

The tasks may need to sync up with each other or even wait for each other. The sync up mechanisms must be designed with a timeout when waiting for a task. The monitoring tasks need to be observed for starvation. For example, comparison mechanism may be implemented in each thread, inter-core communication may be needed, time supervision may be required in case, say the first thread never sends data to the second thread, and vice versa. The waiting may use semaphores which are another potential source of dead-lock. All this adds complexity and requires resources to be used. Furthermore, analysis is then needed to assure that the monitoring constraints are met as all the comparison and monitoring is part of the software.

In the art hardware has been proposed to assist with the verification. For example, United States Patent Application 20080244305 A1, "Delayed Lock-Step CPU Compare" discloses a known CPU compare unit.

In the known system, an electronic device is provided which a first CPU, a second CPU, a first delay stage and a second delay stage and a CPU compare unit. The first delay stage is coupled to an output of the first CPU and a first input of the CPU compare unit. The second delay stage is coupled to an input of the second CPU. An output of the second CPU is coupled to the CPU compare unit. The first CPU and the second CPU execute the same program code and the CPU compare unit is adapted to compare an output signal of the first delay stage with an output signal of the second CPU. By delaying both, the input data of the second CPU and the output data of the first CPU, the time shift due to each of the two delays are compensated at the CPU compare unit. The CPU compare unit always compares data belonging to the same operation step of the CPU program codes being executed in either one of the CPUs. The execution of the program in the first and the second CPU is in a delayed lock-step. Yet, the output signals of the CPUs arrive at the CPU compare unit in lock-step. The CPU compare unit may be adapted to report a match or mismatch of the compared output signals to the system. The system may then react appropriately on the reported error.

In the known system, if one or the other of the two tasks does not complete, the system is stalled without detection. The system requires lockstep operation to ensure synchronization is maintained. The known system requires that the two programs are identical.

SUMMARY OF THE INVENTION

The present invention provides a fault detection unit, a data processing device, an integrated circuit, an electronic fault detection method, a computer implemented fault detection method, a computer program product, a non-transitory tangible computer readable storage medium, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

Figure 1A:
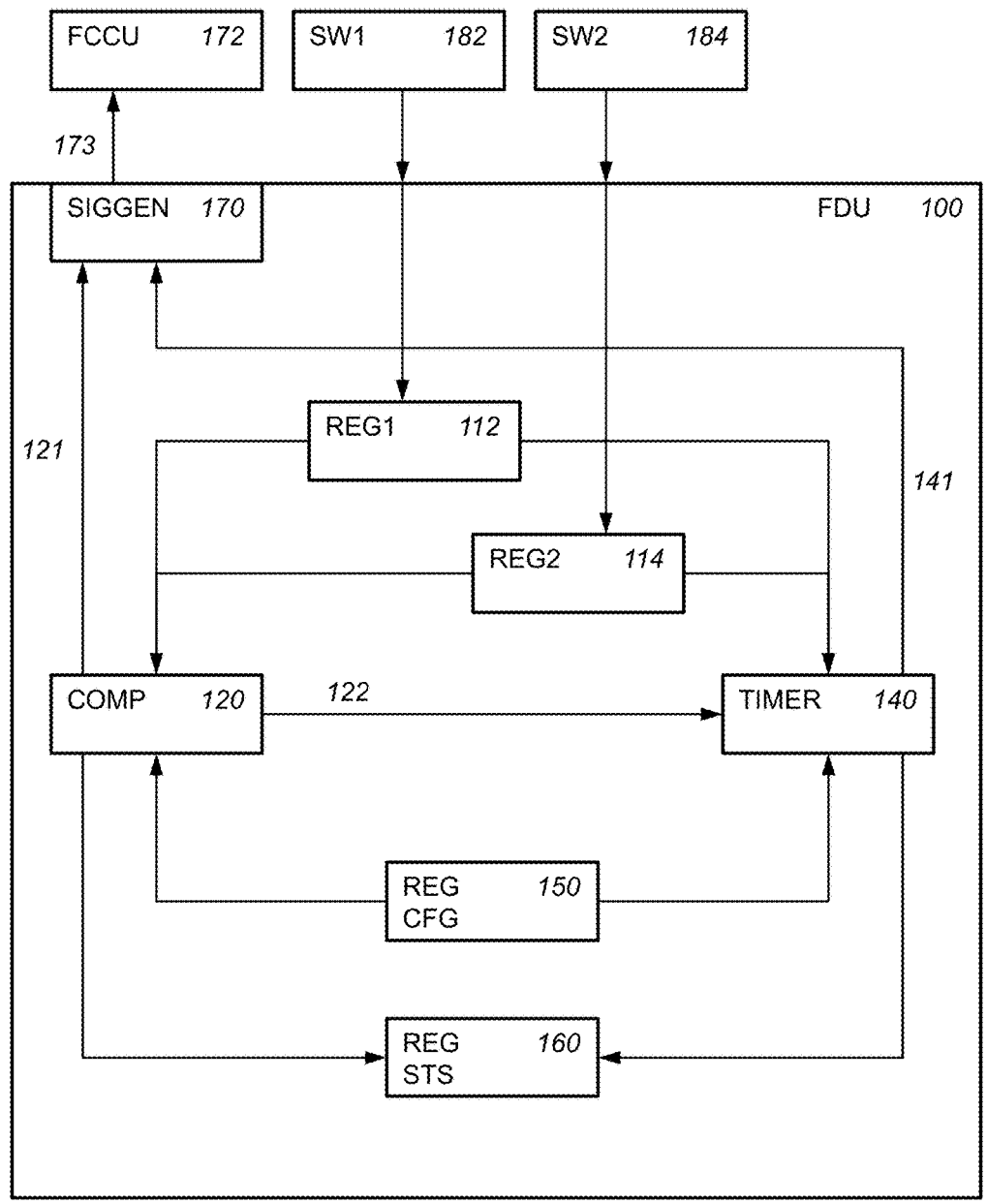
FIG. 1a schematically shows an example of an embodiment of a fault detection unit 100, FIG. 1b schematically shows an example state diagram for an embodiment of a fault detection unit, FIG. 1c schematically shows an example state diagram for an embodiment of a fault detection unit, FIG. 2 schematically shows an example of an embodiment of a fault detection unit 101, FIG. 3 schematically shows an example of an embodiment of a fault detection unit 102, FIG. 4 schematically shows an example of an embodiment of a fault detection unit 103, FIG. 5 schematically shows an example of an embodiment of a fault detection unit 104, FIG. 6a schematically shows an example of an embodiment of a data processing device 200, FIG. 6b schematically shows an example of an embodiment of a data processing device 201, FIG. 7 schematically shows an example flowchart of an embodiment of an electronic fault detection method 300, FIG. 8 schematically shows an example flowchart of an embodiment of an electronic fault detection method 400, FIG. 9 schematically shows an exemplary user interaction system.

LIST OF REFERENCE NUMBERS IN FIGS.
1a-6a 100, 101, 102, 103, 104 a fault detection unit (FDU)
112 a first register (REG1)
113 a first flag (FLG1)
114 a second register (REG2)

115 a second flag (FLG2)
120, 120' a comparator circuit (COMP)
121, 121' a fault signal
122 a timer reset signal
140, 140' a timer circuit (TIMER)
141, 141' a fault signal
142, 144 a timer circuit (TIMER)
150 a configuration register (REG CFG)
160 a status register (REG STS)
170 a signal generator (SIGGEN)
172 fault collection and control unit (FCCU)
173 a fault signal
182, 182' a first software portion (SW1)
184, 184' a second software portion (SW2)
191, 192 a part fault detection unit (SUBFDU1, SUBFDU2)
200, 201 a data processing device
210 a memory (MEM)
222, 224 a processor (CPU1, CPU2)
230 a fault detection unit (FDU)
240 a fault collection and control unit (FCCU)

DETAILED DESCRIPTION OF THE
PREFERRED EMBODIMENTS

In the following, for sake of understanding, the circuitry is described in operation. However, it will be apparent that the respective elements are arranged to perform the functions being described as performed by them.

FIG. 1a schematically shows an example of an embodiment of a fault detection unit 100.

Fault detection unit 100 comprises a first register (REG1) 112 and a second register (REG2) 114. First register 112 is arranged to be written from a first software portion (SW1) 182, and second register 114 is arranged to be written from a second software portion (SW2) 184.

For example, first software portion 182 may be arranged to write first data to first register 112; and second software portion 184 may be arranged to write second data to second register 114. Fault detection unit 100 may be applied to a first and second software portion, e.g., that need to monitor each other. For example, such a situation is present in many safety or fault tolerant applications. In this case, the first and second software portion 182, 184 may be arranged so that the first and second data have a predetermined relationship. Due to failures, e.g., in hardware or software, this predetermined relationship may not be present; detecting this is important for fault tolerance.

First software portion 182 and second software portion 184 may be executed on a single core, e.g. using a single-core microcontroller. In this case, first software portion 182 and second software portion 184 may be portions of a larger software. In this case, first software portion 182 and second software portion 184 may run sequentially, or interleaved, etc.

Fault detection unit 100 is well suited for use with a multi-core microcontroller. Using multiple cores avoids dependent failures (also known as common cause failures), as failure of a single core will lead to malfunction in both software portions running on the single core. When fault detection unit 100 is used with multiple cores, first software portion 182 may run on a first core, second software portion may run on a second core. In this case, first software portion 182 and second software portion 184 may run in parallel.

Fault detection unit 100 comprises a comparator circuit 120. Comparator circuit 120 is coupled to first register 112 and to second register 114. Comparator circuit 120 is arranged to detect that both the first and second register have been written. When both first software portion 182 and second portion 184 have written to first register 112 and second register 114 respectively, this is detected by comparator circuit 120.

Comparator circuit 120 is further arranged to verify a relationship between first data written to first register 112 and second data written to second register 114, after comparator 120 has detected that both registers 112 and 114 have been written.

Comparator circuit 120 is further arranged to signal a fault upon said verification failing, e.g. by sending fault signal 121. If the comparison results in a fail, e.g., the relationship is not satisfied, then a fault is signaled. The fault may be signaled to a fault collection and control unit (FCCU) or anywhere else, say, depending on the microcontroller. There are a number of ways to signal a fault, some which are discussed below. Fault signal 121 may be sent to the outside of fault detection unit 100, but may also be used an internal signal sent, e.g., to a signal generator 170 (see below).

In case comparator circuit 120 successfully verifies the relationship, comparator circuit 120 may return to waiting for both registers 112 and 114 to be written; e.g., comparator circuit 120 waits until it can determine that registers 112 and 114 have been written again after the last verification.

Comparator circuit 120 may be configured for various types of relationships. A number of examples are given below:

In an embodiment, comparator circuit 120 is configured to verify an equality relationship. The comparator circuit is arranged to verify that the first data equals the second data. This embodiment is suited for a first and second software portions that should write equal first and second data to the first and second register, respectively. If data is written to both registers, but they are not equal, comparator circuit 120 signals a fault.

In an embodiment, comparator circuit 120 is configured to verify an inequality relationship. The comparator circuit is arranged to verify that the first data is less than the second data. In an embodiment, comparator circuit 120 is configured to verify a closeness relationship. The comparator circuit is arranged to verify that the absolute value of the first data minus the second data is less than a threshold. These embodiments are suited for a first and second software portions that should write first and second data that are close to each other, but not necessarily equal.

Comparator circuit 120 may be implemented as a digital comparator that compares two digital signed or unsigned integers and signals whether the two integers are equal, the first one greater than the second one, and the first one smaller than the second one, etc. In an embodiment, the comparator circuit 120 is arranged to compare other data types than signed or unsigned integers, e.g., floating point numbers, e.g. IEEE 754 floats.

In an embodiment, comparator circuit 120 may verify other relationships, e.g., that the XOR between the first and second data has a predetermined result, say all '1'. In another embodiment, comparator circuit 120 may be configured with a function f, and verify that $f(x,y)=0$, wherein x and y represent the first and second data respectively.

When comparator circuit 120 is executing the comparison, the first and second software parts may continue running, while the comparison may happen in the background.

A useful addition to fault detection unit 100 is a configuration register (REG CFG) 150. Configuration register 150 can be written from outside fault detection unit 100, e.g., from first and/or second software portion 182, 184. Comparator circuit 120 may be coupled to configuration register

150 for configuration, e.g., to configure comparator circuit 120 for one of multiple relationships in dependence upon configuration data written to configuration register 150.

In an embodiment, the multiple relationships include:
an equality relationship, wherein the comparator circuit is arranged to verify that the first data equals the second data,
a first inequality relationship, wherein the comparator circuit is arranged to verify that the first data is less than the second data. As will be further explained below having the option to configure comparator circuit 120 into, at least one type of inequality relationship also allows to verify if the first and second register are close together. In an embodiment, the multiple relationships further include a second inequality relationship, wherein the comparator circuit is arranged to verify that the second data is less than the first data. Having this additional option makes programming of the software portions easier.

Fault detection unit 100 further comprises a timer circuit (TIMER) 140. Timer circuit 140 is circuit arranged to signal a fault if the verification of comparator circuit 120 does not occur within a time limit, e.g. by sending a fault signal 141. A timer may be implemented, e.g., as a count-down timer, as a count-up timer, etc; In an embodiment, the timer may be a, e.g., 16-bit counter, the size of the timed interval may be set by writing the counter. In an embodiment, the timer interval ranges between 1 ms and 1 second. However, a suitable timing interval depends on the application in which the fault detection unit is applied, and may thus be shorter or longer.

Timer circuit 140 monitors temporal constraints of the comparison between first software portion 182 and second software portion 184. Comparator circuit 120 may be arranged to, upon successful verification, of the relationship reset the timer circuit 140 and return to detecting that both the first and second register have been written; for example, comparator circuit 120 may send a reset signal 122 to timer circuit 140. Fault signal 141 may be sent to fault collection unit 171, or anywhere else. Fault signal 141 may be sent to the outside of fault detection unit 100, but may also be used an internal signal sent, e.g., to a signal generator 170 (see below).

Like comparison circuit 120, also the time supervision may happen in the background. Risk of dead-lock is reduced.

The time limit may be obtained in different ways. Two examples are given below:

In an embodiment, the timer circuit is arranged to start timing an interval upon configuration of fault detection unit 100 (e.g. through configuration register 150) and/or upon successful verification of the relationship by comparator circuit 120. The time limit is reached upon the interval expiring. If comparator circuit 120 successfully verifies a relationship before the interval expired, comparator circuit 120 sends a timer reset signal 122 to timer 140; at this point timer circuit 140 starts the interval anew. On the other hand, if the interval expires before comparator circuit 120 made a successful verification, timer circuit 140 sends a fault of its own, e.g. fault signal 141. In this case, one or both of the first and second software portion were late in performing their processing, e.g., computations. A timer circuit 140 configured in this fashion is referred to as 'watchdog mode'. The timer asserts that comparison occurs periodically within a preset time bound. When watchdog mode is used, the first and second software part may be arranged to write a predetermined number, sometimes called a magic number to the first and second register. Although the predetermined number does not depend on a calculation, and thus no calculation is verified, this will spot that one or both of the first and second software parts got stuck, crashed, etc. Instead of a predetermined number, a calculated number is also possible.

In an embodiment, the timer circuit is arranged to start timing an interval upon writing of the first or second register. The time limit is reached upon the interval expiring, so that the timer signals the fault if the other one of the first register or the second register is not written within the interval, e.g., by sending fault signal 141. If comparator circuit 120 successfully verifies a relationship before the interval expired, comparator circuit 120 sends a timer reset signal 122 to timer 140; at this point timer circuit 140 starts waiting for one of the registers 112 and 114 to be written and then starts the interval anew. On the other hand, if the interval expires before comparator circuit 120 made a successful verification, timer circuit 140 sends a fault of its own. In this case, one of the first and second software portions was too much slower than the other one. A timer circuit 140 configured in this fashion is referred to as 'window mode'. The timer asserts that comparison occurs within a certain time limit from the moment when one of the first registers and second register was written.

The size of the interval may be fixed or configured, e.g., through configuration register 150. In embodiment, timer circuit 140 is configurable for watchdog mode or window mode through configuration register 150.

Fault detection unit 100 may further comprise a status register (REG STS) 160. Status register 160 is coupled to comparator circuit 120. In an embodiment, status register 160 is arranged to indicate a result of a previous verification of the comparator circuit. This status register 160 allows the fault detection unit 100 to be used in an arrangement in which signals, e.g., the signals of comparator circuit 120 and timer circuit 140 are suppressed. Having a status register allows a pull instead of a push resolution of fault signals.

In an embodiment, status register 160 is arranged to indicate that one of the first and second register have been written, but not the other. A software portion, say first software portion 182, which has already written its data, say first data, can use this status register 160 to determine if the other software portion has reached writing its data yet. Thus first software portion 182 can poll the status register and wait until it continues execution the first software portion. In an embodiment, the status register indicates a state of timer circuit 140. For example, status register 160 may indicate the states: counting, stopped, and timeout (fault).

In an embodiment, status register 160 combines multiple statuses, e.g., of the latest verification, of which registers have been written, and the status of the timer.

Fault detection unit 100 may further comprise a signal generator 170. Signal generator 170 is arranged to receive fault signal 121 from comparator circuit 120 and fault signal 141 from timer circuit 140, and to forward a fault signal to outside fault detection unit 100. Signal generator 170 is convenient, though embodiments may omit signal generator 170. Fault detection unit 100, e.g., through signal generator 170, may forward the signal to a fault collection and control unit (FCCU) 172. A fault collection and control unit is a redundant hardware channel to collect errors, and, as soon as a failure is detected, to lead the device to a safety state in a controlled way. For example, signal generator 170 may be arranged to send a signal 173 external to fault detection unit 100. Signal 173 may encode the nature of the fault. For example, signal 173 may contain a message indicating a comparator or timer fault; adding the latter message need add only 1 bit to signal 173. In an embodiment, the CPU(s) executing the first and second software portion are not used by the FCCU.

Note that if either the first or second software portion does not complete its task, e.g., a computation, e.g., deriving the first or second data, the system could detect this when a time limit is not met. For example, first or second software portion may enter an infinite loop, or have a so-called crash, etc. Moreover, the system does not require lockstep operation between the first and second software portion. Synchronization fault are easily detected through the fault detection unit, and can be controlled, e.g., at intermediate points, when writing to the fault detection unit. In fact, it is not even required that the first and second software portion use identical code.

Window mode will not detect if both the first and second software portion 182, 184 do not reach writing the first or second register. To detect this watchdog mode may be useful. On the other hand, watchdog mode may require frequent writing to the register, and thus place higher demand on the software, and on the designer of the software. Watchdog mode and window mode may be combined, either in a single fault detection unit, or in a system comprising a first fault detection mode configured for watchdog mode and a second fault detection unit configured for window mode (see also below).

Figure 1B:
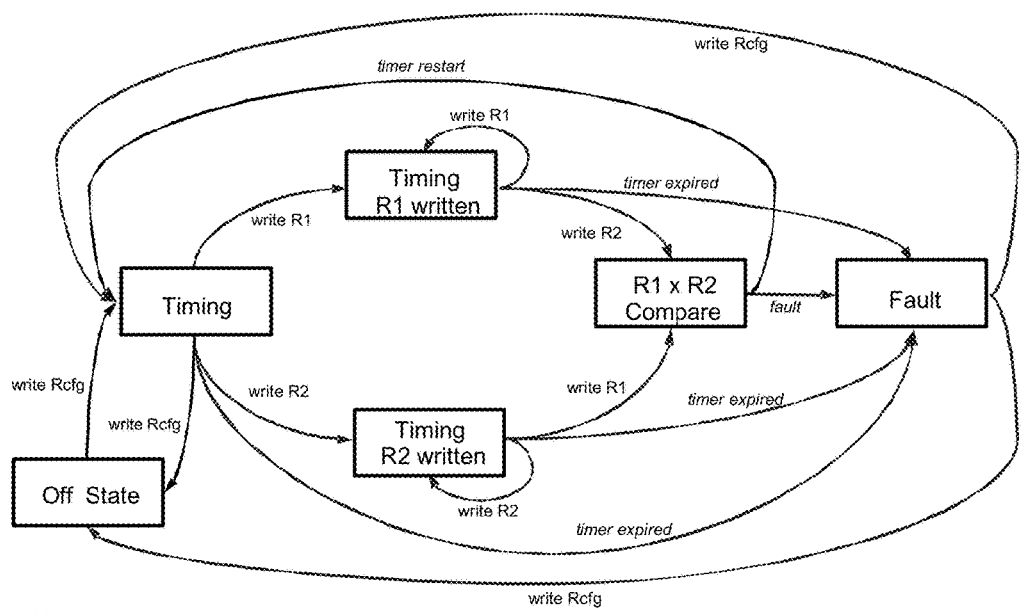

FIG. 1b schematically shows an example state diagram for an embodiment of a fault detection unit. The embodiment shown in FIG. 1b uses so-called watchdog mode.

From the off-state of the fault detection unit, writing the configuration register (denoted Rcgf in FIGS. 1b and 1c), the timer is started. Timing continues when the first register (denoted R1) or the second register (denoted R2) is written. From each of the states 'Timing' (no registers written yet), 'Timing R1 written' (only R1 written), and 'Timing R2 written' (only R2 written), the fault detection unit enters the state 'Fault', when the timer expires. When both R1 and R2 are written, the state 'R1×R2 compare' is entered; the fault detection unit performs a verification. If the verification is successful, the timer is restarted, and the fault detection unit returns to the 'timing' state. If the verification was not successful, the system also enters the Fault state. In the fault state a fault signal is generated. The fault detection unit can leave the fault state, e.g., by a rewriting, e.g., resetting, of the configuration register.

Figure 1C:
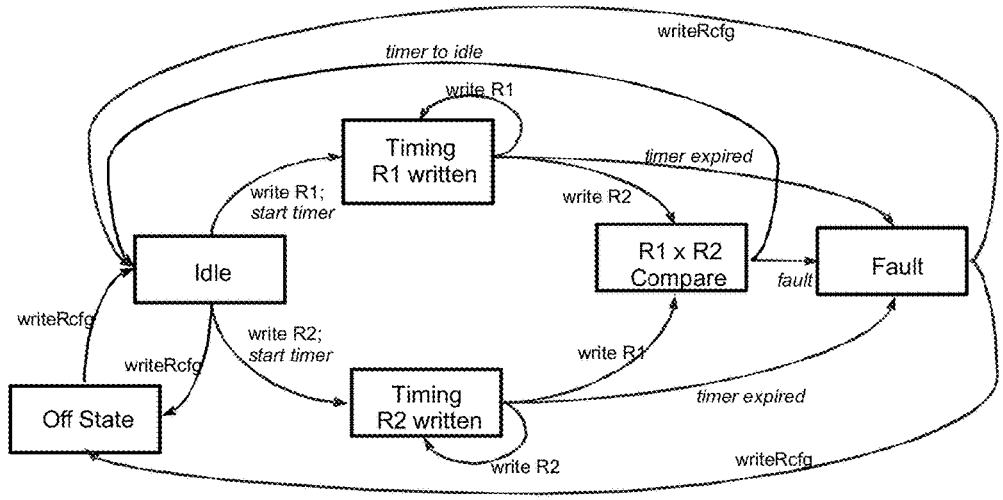

FIG. 1c schematically shows an example state diagram for an embodiment of a fault detection unit. The embodiment shown in FIG. 1c uses so-called window mode.

The fault detection unit is started by writing the configuration register; the fault detection unit enters the 'Idle' state. In the Idle state, the timer is not yet started. Upon writing R1, the fault detection unit enters the state 'Timing R1 written'. Upon writing R2, the fault detection unit enters the state 'Timing R1 written'. In both cases, the timer is started. Otherwise, the fault detection unit is the same as state diagram 1b.

Figure 2:
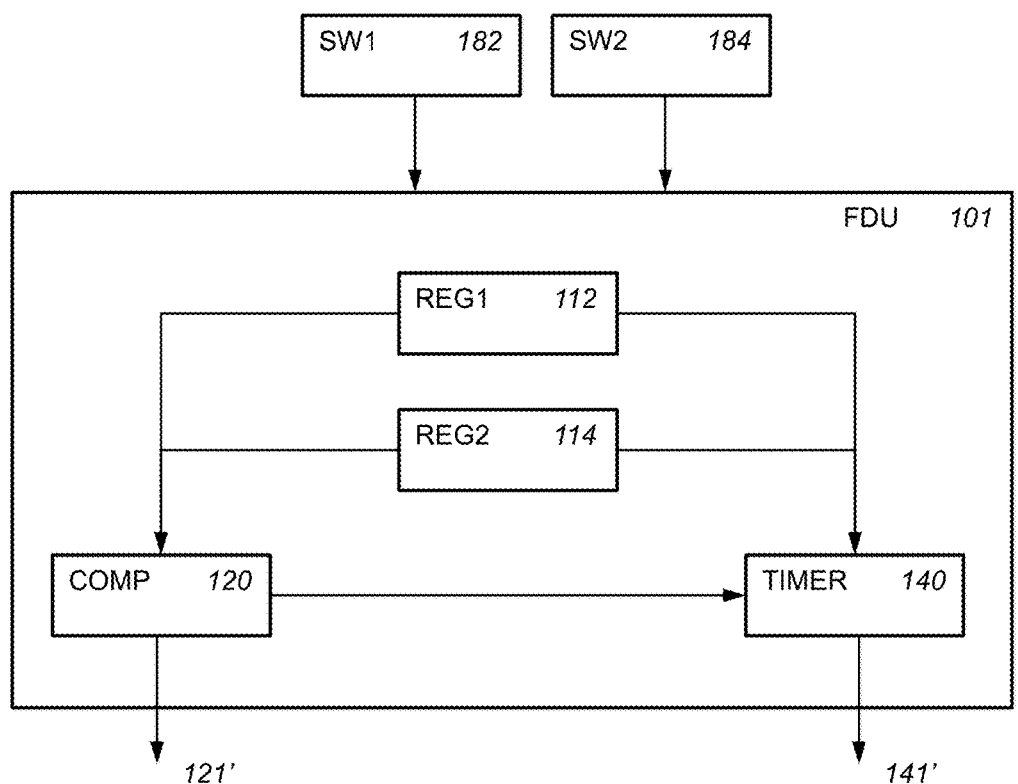

FIG. 2 schematically shows an example of an embodiment of a fault detection unit 101. Fault detection unit 101 is similar to fault detection unit 100, except that many optional components have been removed to obtain a fault detection unit that requires fewer resources. Fault detection unit 101 does not comprise signal generator 170, configuration register 150, and status register 160. First software portion 182 and second software portion 184 are arranged to write to first register 112 and second register 114 respectively. Fault detection unit 101 exports two signals, one for comparator circuit 120 and one for timer circuit 140. These signals may be routed to an FCCU, however this is not needed. The signals may, e.g., raise an interrupt. The interrupt may be handled by a processor core, say, the same core that executes the first and/or second software portion. Fault detection unit 101 may be extended with a signal generator 170, configuration register 150, and/or a status register 160.

Figure 3:
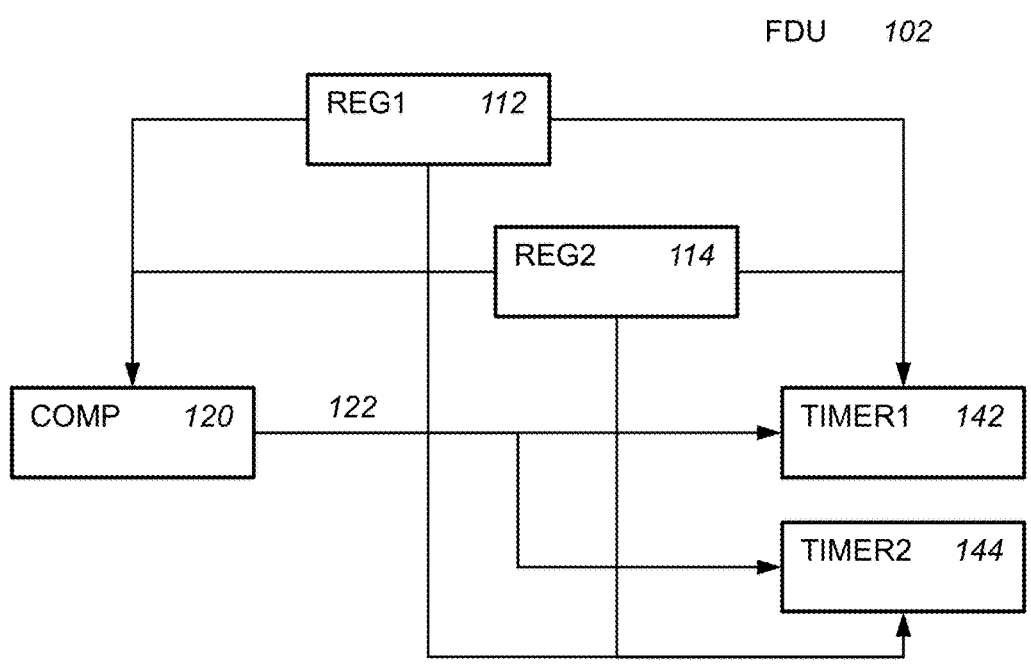

FIG. 3 schematically shows an example of an embodiment of a fault detection unit 102. Fault detection unit 102 is the same as fault detection unit 100 except that timer circuit 140 has been replaced by two timer circuits: timer circuit 142 and timer circuit 144. FIG. 3 only shows relevant different parts.

Timer circuit 142 and timer circuit 144 are both coupled to first register 112 and second register 114. Timer circuit 142 and timer circuit 144 are both coupled to comparator circuit 120 to receive timer reset signal 122. Timer circuit 142, e.g., is arranged in watchdog mode, as described above. Timer circuit 144, e.g., is arranged in window mode, as described above. Fault detection unit 102 monitors both that no process is much later than another, it also monitors that all processes make progress. A configuration register of fault detection unit 102 may disable one of the two timers.

A similar effect may be obtained by using two fault detection units, one configured for watchdog and one for window mode. The latter uses an additional fault detection unit and may require some more work in the software portions, e.g., the software portions are required to write results to two fault detection units, instead of one.

Figure 4:
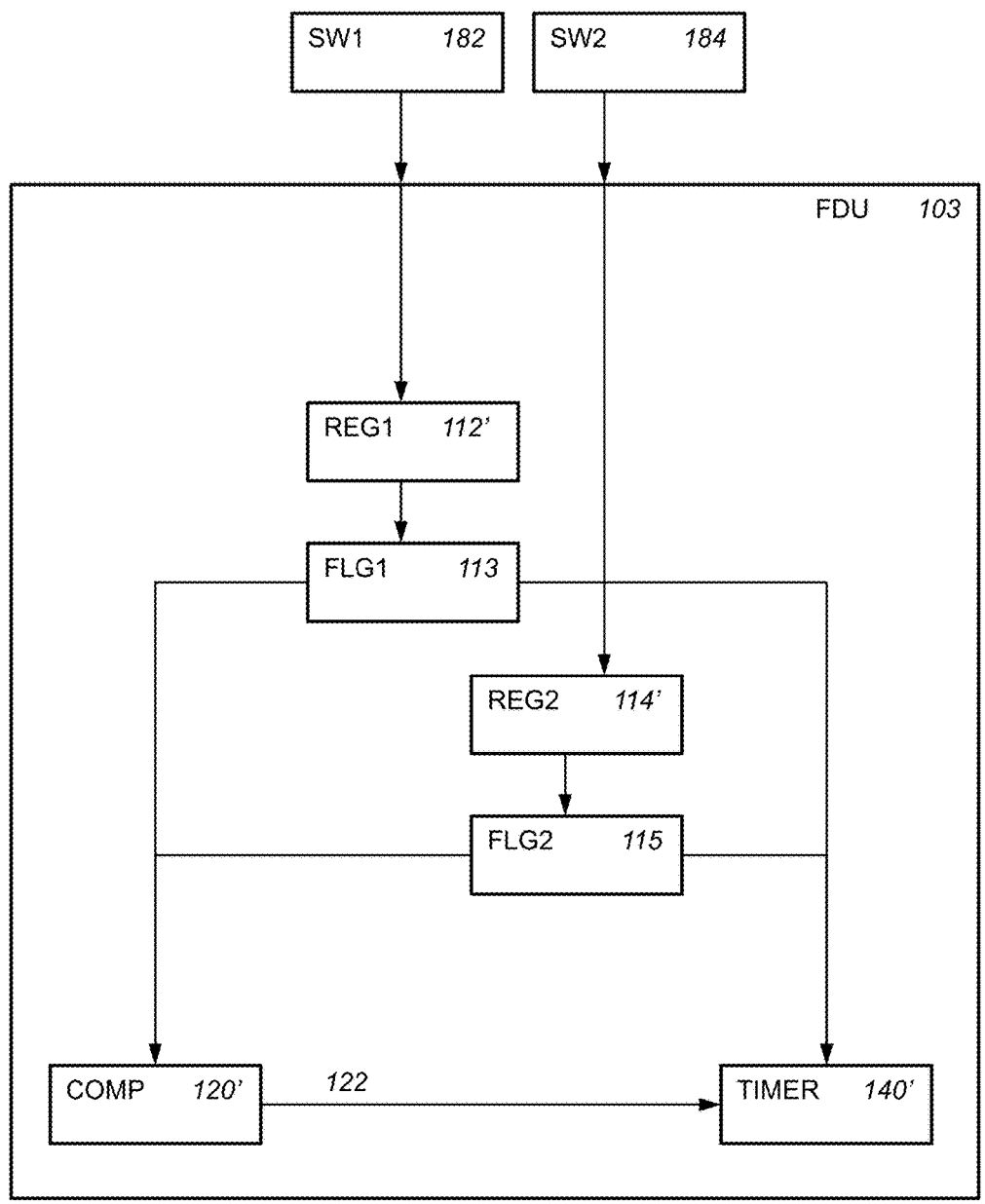

FIG. 4 schematically shows an example of an embodiment of a fault detection unit 103. Fault detection unit 103 comprises a first register 112', a second register 114'. Both registers are writeable from first and second software portion 182 and 184. Fault detection unit 103 comprises a comparator circuit 120' for verifying a relationship between first data written to the first register and second data written to the second register, and a timer circuit 140' for signaling a fault if said verification of the comparator circuit does not occur within a time limit. Fault detection unit 103 shows a possible implementation of detecting that a register of the first and second registers have been written.

Fault detection unit 103 comprises a first electronic flag (FLG1) 113 coupled to first register 112'. First electronic flag 103 is arranged to be set upon writing of first register 112'. Fault detection unit 103 comprises a second electronic flag (FLG2) 114 coupled to second register 114'. Second electronic flag 115 is arranged to be set upon writing of second register 114'.

To detect if a register has been written, comparator circuit 120' does not need to monitor a change in a register, but rather can monitor two flags. Comparator circuit 120' may be arranged to detect that both the first and second flag are set, e.g., comparator circuit 120' may comprise a AND-circuit for computing the logical AND of flags 113 and 115; if the AND-circuit reports true (e.g. both inputs are set) then comparator circuit 120' can start verification.

The flags may be used by timer circuit (TIMER) 140' as well, especially in window mode. To detect if at least one register has been written, timer circuit 140' does not need to monitor a change in a register, but rather can monitor two flags. Timer circuit 140' may be arranged to detect that at least one of the first and second flag are set, e.g., timer circuit 140' may comprise an OR-circuit for computing the logical OR of flags 113 and 115; if the OR-circuit reports true (e.g. at least one of the inputs are set) then timer circuit 140' can start the timer.

Comparator circuit 120' is configured to reset the first flag 113 and second flag 115 at least upon successful verification of the relationship. The flags may also be reset upon writing of the configuration register (if present). The two-flags solution may be applied in any one of the shown fault detection units, e.g. fault detection units 100, 101, 102, and 104 (see below).

Figure 5:
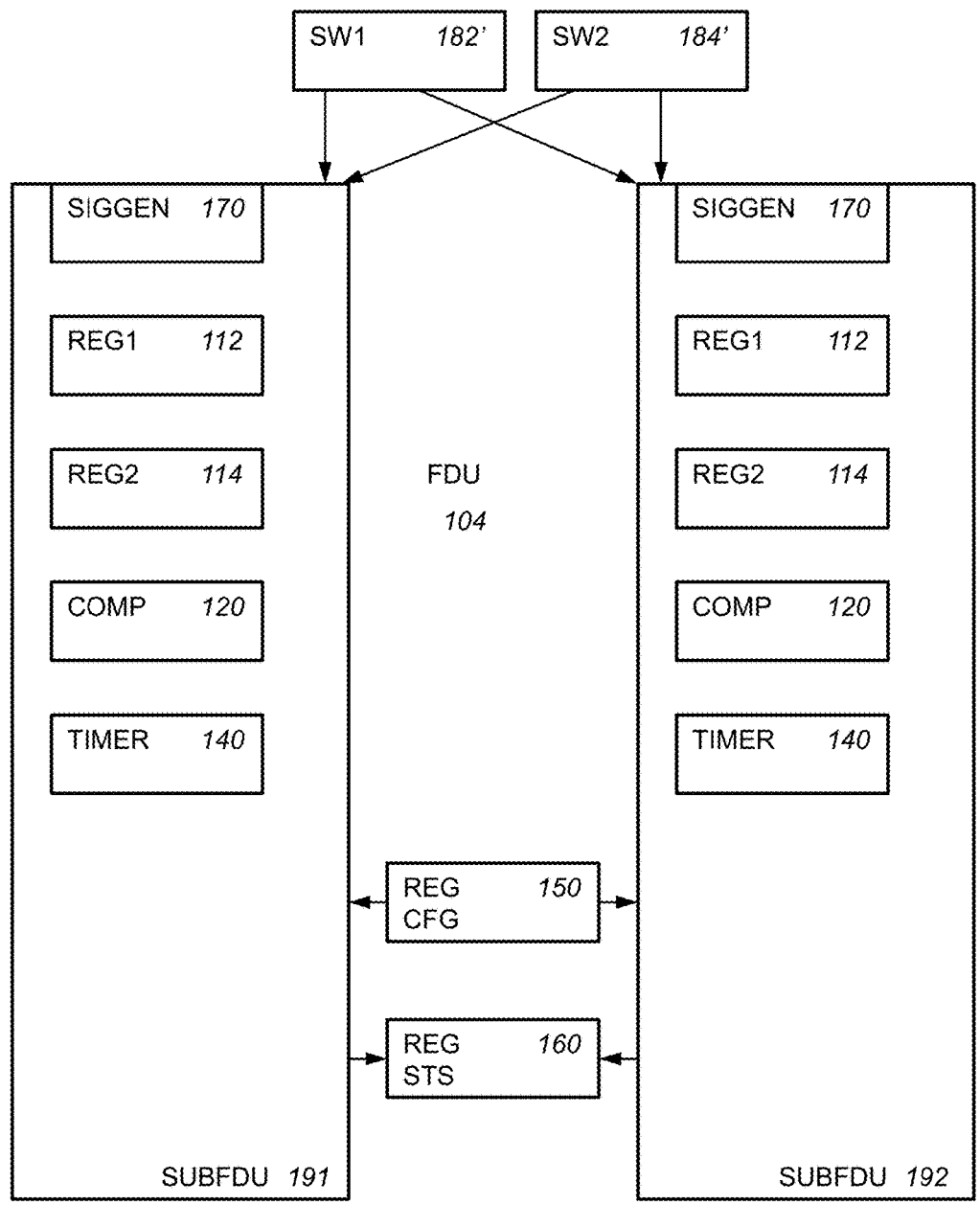

FIG. 5 schematically shows an example of an embodiment of a fault detection unit 104.

For example, the fault detection unit may well be used in a safety domain. It may be desired to protect the fault detection unit itself from failing. Fault detection unit 104 addresses these aspects.

Fault detection unit 104 combines two fault detection subunits operating in parallel. Shown are fault detection subunit (SUBFDU) 191 and fault detection subunit (SUBFDU) 192. The two fault detection subunits execute in parallel. Fault detection unit 104 is also referred to as a dual fault detection unit. Fault detection subunits may be fault detection units as described herein, e.g., fault detection unit 100, 101, 102, or 103.

The first and second registers 112, 114 are duplicated, so each value is stored twice, once for each fault detection subunit. Each fault detection subunit has its own timer circuit 140 and its own comparator circuit 150. Thus the first register, the second register, the comparator circuit, and the timer circuit of the first fault detection subunit 191 are different from, e.g., is not the same as, each one of the first register, the second register, the comparator circuit, and the timer circuit of the second fault detection subunit 192. In this embodiment, each fault detection unit has its own first register, second register, comparator circuit, and timer circuit.

Only the status register 160 and the configuration register 150 are single; these are shared between the two fault detection subunits 191, 192.

If one of the two part fault detection units (SUBFDU1, SUBFDU2) fails to detect a fault (e.g., comparison or timeout) the other shall still signal the fault. Note that it not considered a problem that a dual fault detection unit may increase false positives, e.g., a fault signal even if no bad comparison or time-out condition is present. In fact a fault of this manner is considered a fault in its own right, namely a fault detection unit fault. Status register 160 may be configured to store the previous verification result of both fault detection units 191 and 192. This allows detecting a faulty fault detection unit.

First software portion 182' is arranged to write first data to a first register of fault detection subunit 191 and to a first register of fault detection subunit 192. Second software portion 184' is arranged to write second data to a second register of fault detection subunit 191 and to a second register of fault detection subunit 192.

In an embodiment, both registers 112 (REG1) of fault detection units 191 and 192 are mapped the same first logical register. Likewise, both registers 114 (REG2) of fault detection units 191 and 192 are mapped the same second logical register. The first software portion 182' is arranged to write first data to the first logical register and the second software portion 184' is arranged to write second data to the second logical register. As a result the writing to the registers is done at simultaneously. A write to the first logical register writes at the same time to both replicas. When the first data, say a computational result, is written to the first logical register of the dual FDU the written value is stored internally in the two first registers of each SUBFDU. The same holds for the second logical register.

In an embodiment, the configuration register is protected against bit flips. In an embodiment, independent clock signals are used by fault detection unit 191 and fault detection unit 192 to avoid a common cause fault in clock distribution.

The fault detection units described herein, e.g. fault detection units 100, 101, 102, 103 and 104, may be implemented as an integrated circuit, e.g., on a semiconductor substrate.

One or more fault detection units may be combined together with one more processor cores in an integrated circuit, e.g., in a so-called, system-on-chip (SoC), e.g., an automotive system-on-chip.

Figure 6A:
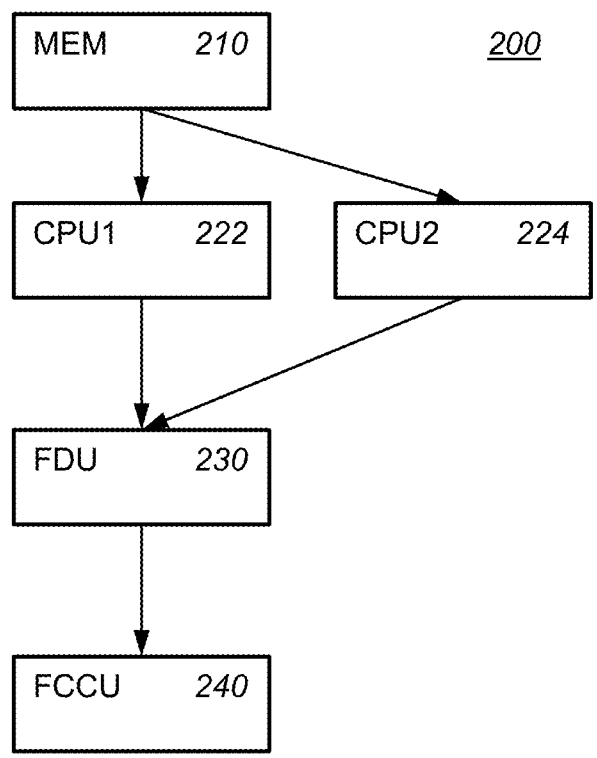

FIG. 6a schematically shows an example of an embodiment of a data processing device 200.

Data processing device 200 comprises a memory 210 storing the first and second software portion. Data processing device 200 comprises a first processor (CPU1) 222, e.g., a 'core', to execute the first software portion, and a second processor (CPU2) 224, to execute the second software portion. Memory 210 may be split in two or more physical memories.

Data processing device 200 comprises at least one fault detection unit (FDU) 230 as described herein, e.g., fault detection unit 100, 101, 102, 103, or 104. Data processing device 200 comprises a fault collection and control unit (FCCU) 240.

Fault detection unit 230 can signal faults to FCCU 240. Instead of a fault collection and control unit, fault detection unit 230 may be arranged to raise an interrupt. CPU1 222 and/or CPU2 224 may respond to the interrupt to handle the fault.

Data processing device 200 is arranged so that the first and second registers of fault detection unit 230 are writeable from the first and second software portion.

For example, fault detection unit 230 may be configured to verify an equality relationship and to monitor a temporal relationship. This configuration may be done by writing a configuration register of fault detection unit 230.

The first software portion may comprise one or more instructions arranged to perform a first computation resulting in a first computation result, and one or more instructions arranged to write the first computation result to the first register of the first fault detection unit of the data processing device.

The second software portion may comprise one or more instructions arranged to perform a second computation resulting in a second computation result, and one or more instructions arranged to write the second computation result to the second register of the first fault detection unit.

If the first and second software portion work correctly and the first and second computation results are equal, and these were computed within the time limit, no fault will be signaled. However, if the first and second computation results are different or at least one of them is not available before the time limit, a fault will be signaled.

Figure 8:
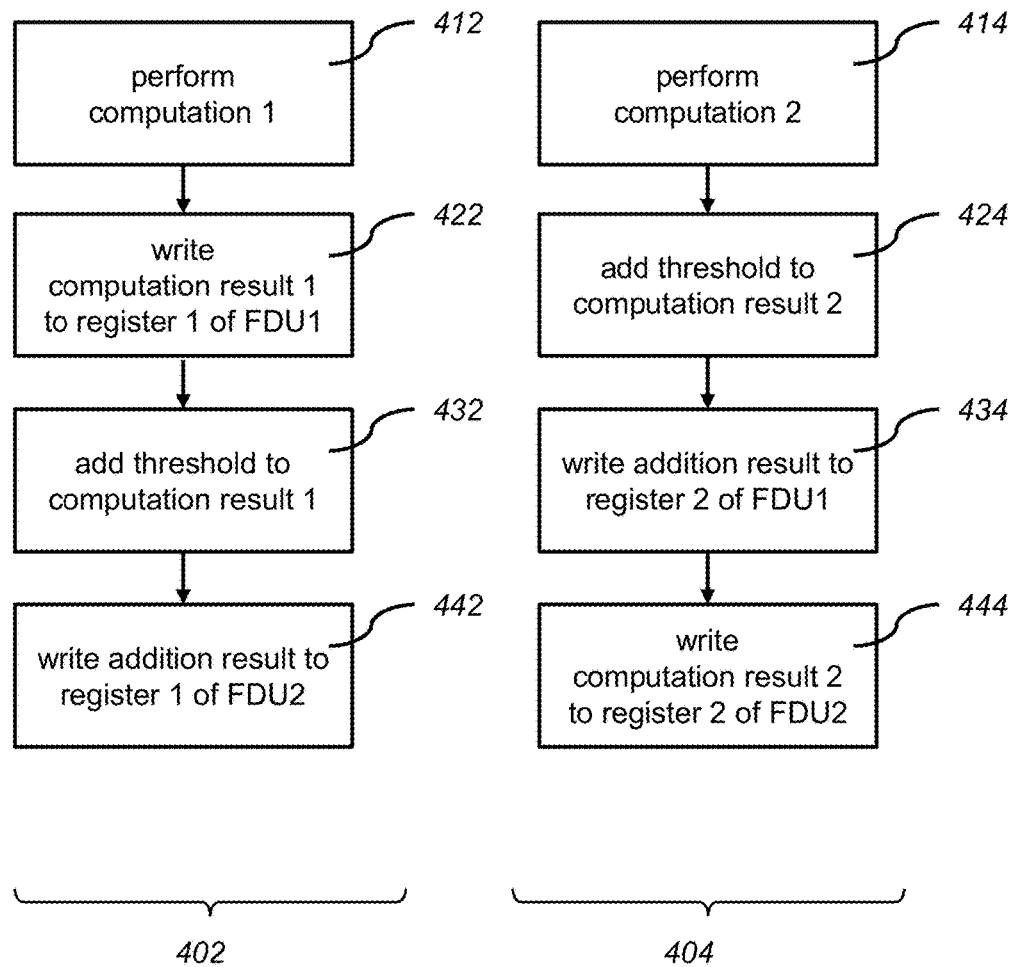

The first and second software portion may also, or instead, be programmed according to the flow chart shown in FIG. 8.

If a fault happens, data processing system 200 may enter a so-called a safe state. A safe state may be operational, silent, or a mixture of both, etc. The fault detection mechanism allows the system to take appropriate action, e.g., through an FCCU, or through some other fault response unit arranged to receive a fault signal from a fault detection unit and to perform a fault action. Fault actions may, e.g., be booting down the system, writing log data, turning off dangerous components, such as radiating or moving components, and the like.

Faults may be detected by having two independent software threads checking each other. The fault detection unit facilitates the checking mechanisms and the monitoring of hard real-time constraints.

In an embodiment, the data processing system comprises at least two CPUs (cores) that run tasks that are monitored by multiple fault detection units. Access to a fault detection unit may be mediated by a library. In an embodiment, the fault detection units are independent of the CPUs, and also monitor a multi-core operating system running on the data processing system.

Figure 6B:
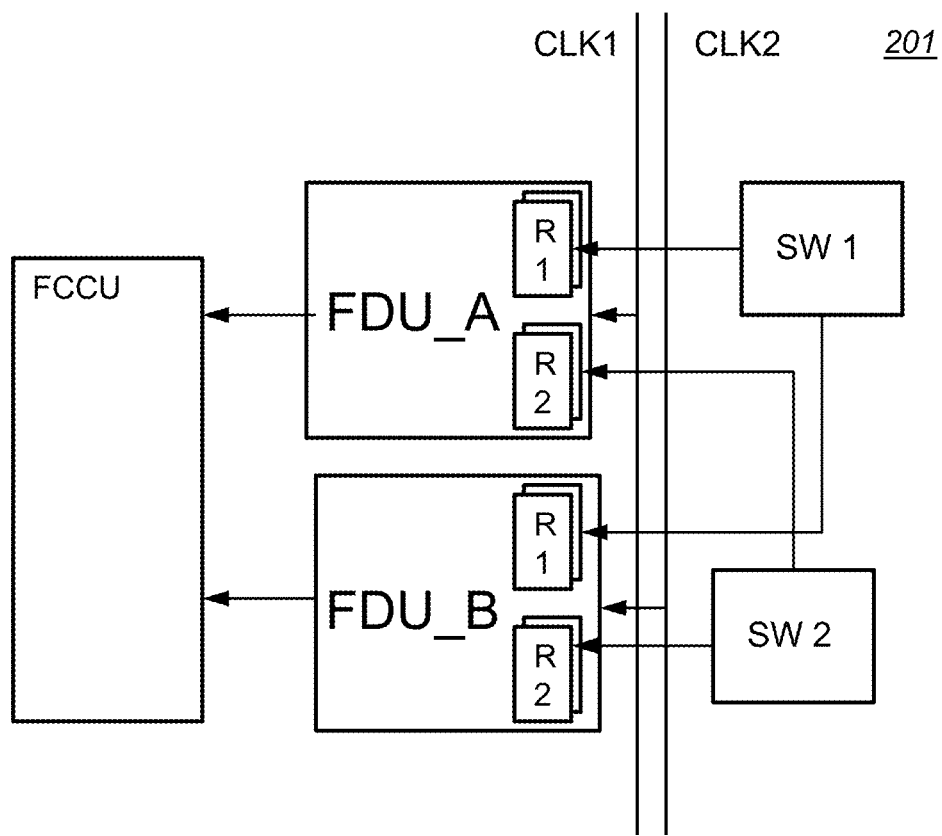

FIG. 6b schematically shows an example of an embodiment of a data processing device 201 having multiple fault detection units. Multiple fault detection units allow a system to run more tasks. A single fault detection unit may not be sufficient if a system runs many tasks.

FIG. 6b shows two sets of fault detection units: a first set marked FDU_A, and a second set marked FDU_B. Software 1 (SW1) and software 2 (SW2) may write to the registers of the fault detection units in the two sets.

The fault detection units may be gathered in two die lakes on an integrated circuit. For example, a number of fault detection units, say 20, are separated into two sets, each containing half the number of fault detection units, say 10. Each set is implemented in a different lake and may use a different clock source (CLK1 or CLK2).

The first and second software portion may use two fault detection units, writing a computation result to two registers of two different fault detection units; the two fault detection units being from different sets. This reduces common cause failures based on local damage to the chip. In this case, two fault detection units do not share states and/or configuration register.

A lake is understood herein as a set of design modules for which additional separation logic is implemented and/or for which additional placement and routing constraints are applied during physical synthesis of the design to a silicon die. It is possible to define and implement multiple lakes for multiple mutual exclusive sets of modules on the same die. Lakes reduce dependent failures between modules contained in different lakes.

Figure 7:
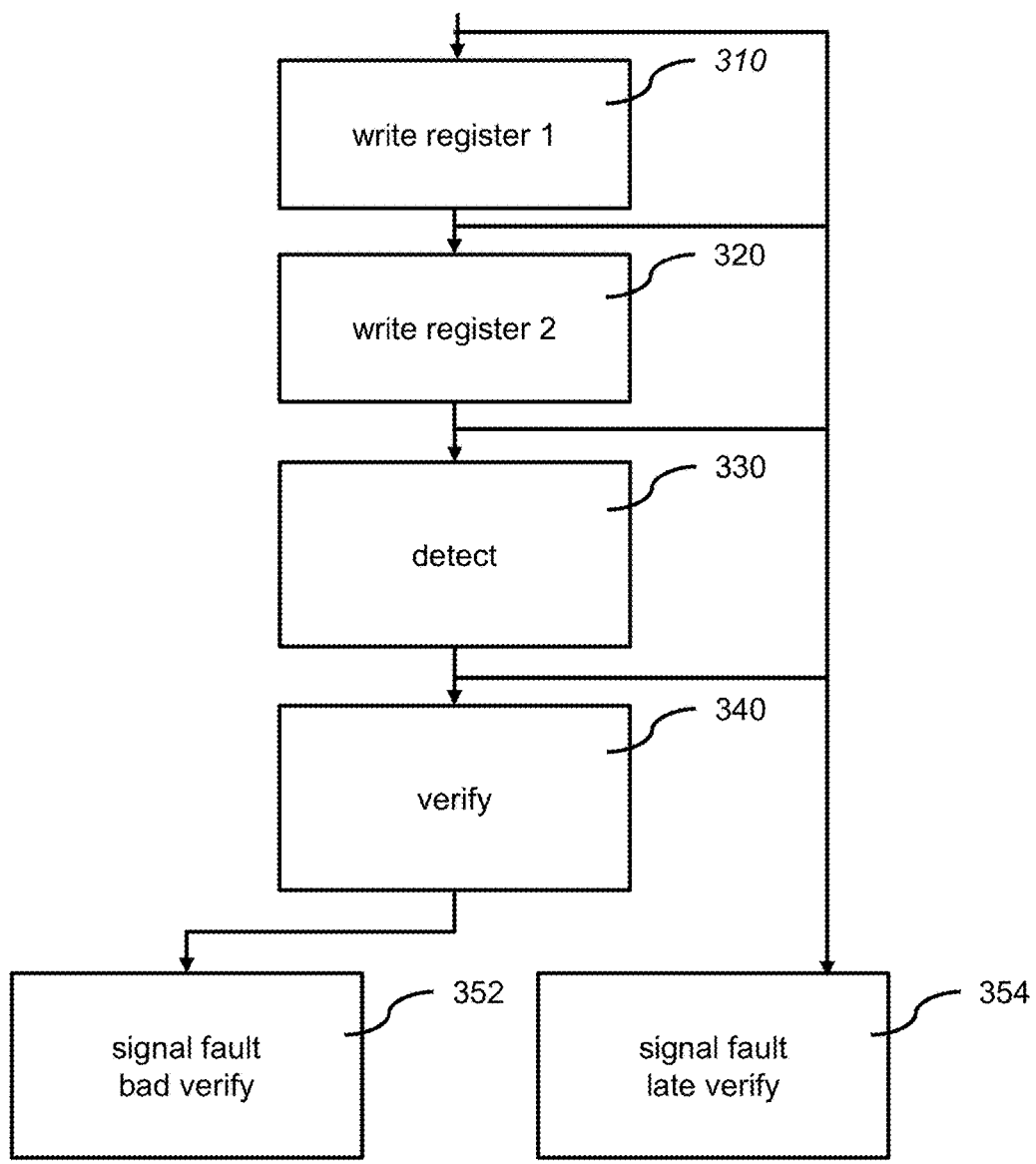

FIG. 7 schematically shows an example flowchart of an embodiment of an electronic fault detection method 300.

Method 300 comprises
 writing 310 a first register from a first software portion, e.g. register 112,
 writing 320 a second register from a second software portion, e.g. register 114,
 detecting that both the first and second register have been written, e.g. by a comparator circuit 120,
 verifying a relationship between first data written to the first register and second data written to the second register upon, e.g. by comparator circuit 120,
 signaling 352 a fault upon said verification failing, e.g. by comparator circuit 120,
 signaling 354 a fault if said verification of the comparator circuit does not occur within a time limit, e.g., by timer circuit 140.

A late verify can be signalled before register 1 is written or before register 2 is written. Once they are both written there is still a chance for time expiration but the probability is quite very low. The order of writing the registers may be reversed.

FIG. 8 schematically shows an example flowchart of an embodiment of an electronic fault detection method.

The method shown has two parts: a first part 402 and a second part 404. First part 402 may be executed in the form of a first software portion, and second part 404 may be executed in the form of a second software portion.

Part 402 comprises performing 412 a first computation resulting in a first computation result; for example, the first software portion comprises one or more instructions arranged to perform a first computation resulting in a first computation result.

Part 404 comprises performing 414 a second computation resulting in a second computation result; for example, the second software portion comprises one or more instructions arranged to perform a second computation resulting in a second computation result.

First and second software are arranged so that the first and second computation result should be close, e.g., within a threshold value of each other. For example, the first and second software may compute the same numerical computation, but use a different implementation and/or algorithm. Having different implementations reduces common cause failures, as it is unlikely that the same software failure will be present in independent implementations. However, as, say, the round-off errors in the two implementations are different, it may happen that the two implementations do not give exactly the same results.

We will denote the first computation result as '$c_1$' and the second computation result as '$c_2$'. Ideally $c_1=c_2$, however this may not be the case.

Part 402 comprises writing 422 the first computation result to the first register of a first fault detection unit of the data processing device; for example, the first software portion comprises one or more instructions arranged to write the first computation result to the first register of a first fault detection unit of the data processing device.

Part 404 comprises adding 424 a threshold value to the second computation result, and to writing 434 the result to the second register of the first fault detection unit of the data processing device; for example, add the threshold value to the second computation result, and to write the result to the second register of the first fault detection unit of the data processing device.

The first fault detection unit is configured for a first inequality relationship, wherein a comparator circuit of the first fault detection unit is arranged to verify that a first data written to the first register is less than a second data written to the second register. The first fault detection unit may comprise a configuration register for changing the relationship. The first fault detection unit may also be fixed for this particular relationship.

We will denote the threshold as 't', t>0. Thus the fault detection unit verifies that $C_1<c_2+t$.

Part 402 comprises adding 432 a threshold value to the first computation result, and writing 442 the result of the addition to a first register of a second fault detection unit of the data processing device; for example, the first software portion comprises one or more instructions arranged to add a threshold value to the first computation result, and to write the result to a first register of a second fault detection unit of the data processing device.

Part 404 comprises writing 444 the second computation result to a second register of the second fault detection unit of the data processing device; for example, the second software portion comprises one or more instructions arranged to write the second computation result to a second register of the second fault detection unit of the data processing device.

The second fault detection unit is configured for a second inequality relationship, wherein a comparator circuit of the second fault detection unit is arranged to verify that a first data written to the first register is more than a second data written to the second register. The second fault detection unit may comprise a configuration register for changing the relationship. The second fault detection unit may also be fixed for this particular relationship.

Thus the second fault detection unit verifies that $c_1+t>c_2$.

These two relationships imply that $|c_1-c_2|<t$

Thus a closeness relation has been verified using only a fault detection unit configured to verify inequality. Note that the same may be achieved by using one or two fault detection units arranged only for the less-than relationship, or a single fault detection unit configured for a closeness relationship.

A different threshold may be used by the first and second fault detection unit, e.g. a first and second threshold, though this will result in a different closeness relation than derived here. A suitable value of the threshold depends on the application, the algorithms used etc. For example, the threshold may be 1% or 0.1% etc of an expected magnitude of the first computation result.

If two different fault detection units are used, there is no need for the first software portion to wait before writing 442 until second software portion has completed writing 434 or vice versa. Thus synchronization in software between two software parts may be avoided. There is no need to separately monitor that either the first or second computation finishes as the timer circuit will be triggered if needed. For example, if the timer circuit is configured for window mode, a fault will be signaled if writing 422 happens too much later or sooner than writing 434.

If a single fault detection unit is used for method 400, the first and second software portion need to wait until the fault detection unit is finished before the next comparison. For example, after writing 422 and before writing 442, part 402 may comprise determining that the fault detection unit finished the comparison, e.g., using a status register of the fault detection unit. For example, after writing 434 and before writing 444, part 404 may comprise determining that the fault detection unit finished the comparison, e.g., using the status register of the fault detection unit.

Method 400 may comprise configuring the first and/or second fault detection unit for the respective relationship. The configuration may be performed by any one of parts 402 or 404, or by yet a further part.

Method 400 may comprise configuring the first and/or second fault detection unit for a time interval, for example, the first and/or second fault detection unit may be configured for window mode and/or watchdog mode, before starting the first and second computation. In case of window mode, the time interval is set to an allowed time difference, say 1 ms, 10 ms, etc. In case of watchdog mode, the time interval is set to an allowed time for computing the computation, say, 10 ms, 100 ms, etc.

The configuration for the timer and/or comparator may be performed by any one of parts 402 or 404, or by yet a further part.

Part 402 may execute on a first core, part 404 may execute on a second core. This is not strictly necessary though; both parts could execute on a single core, e.g., interleaved. For example, the parts may be executed in the following order: 412, 422, 414, 424, 434, 432, 442, 444; other orders are possible.

Figure 9:
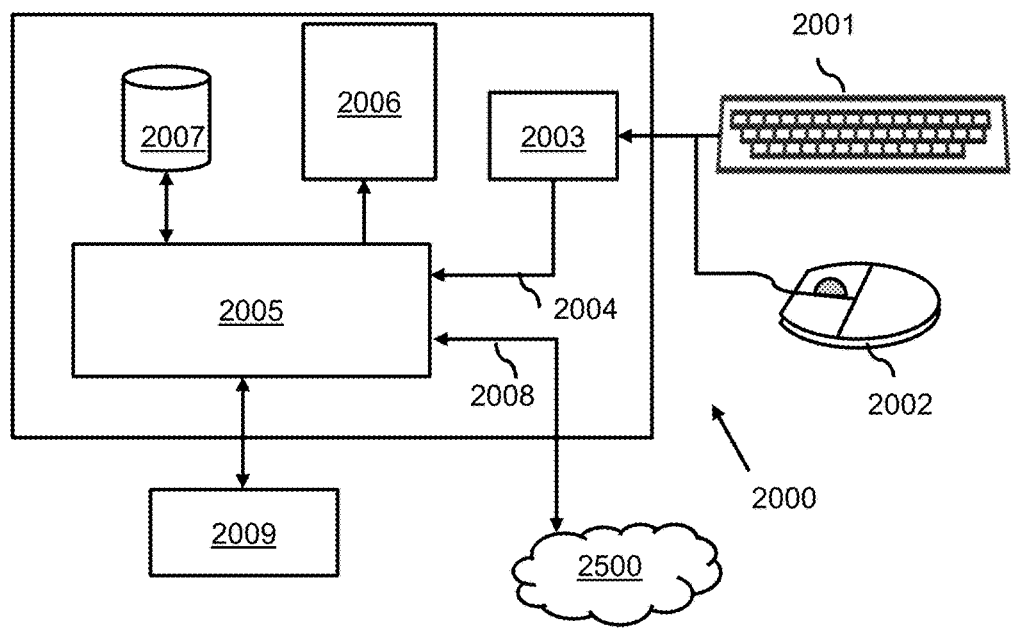

FIG. 9 schematically shows an exemplary user interaction system 2000 having a programmable processor 2005. The user interaction system 2000 is shown to be a personal computer, but may be any type of suitable user interaction system 2000. The programmable processor may comprise one or more fault detection units. The user interaction system 2000 further comprises a storage unit 2007, a user input 2003 and a display 2006. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the invention, to receive user data and user instructions 2004, to present visual information on the display 2006 and to communicate with a data I/O device 2009, such as an optical disc drive or a solid state reader/writer. The processor 2005 is arranged to cooperate with the storage unit 2007, allowing storing and retrieving information on the storage unit 2007. The user interaction system 2000 may further comprise a communication channel 2008 allowing the processor 2005 to connect to an external cloud 2500 for communicating with other devices in the cloud. The external cloud may e.g. be the Internet. The user interaction system 2000 may allow safety applications to be executed by a user. The processor 2005 may also be arranged to retrieve data determined during further executions of the processor or from the storage unit 2007, or from another device in the cloud 2500, and generate a report by the processor 2005. The processor 2005 may be capable to read, using the data I/O device 2009, a computer readable medium comprising a program code. The processor 2005 may be capable to read, using the data I/O device 2007, a computer readable medium comprising a computer program product comprising instructions for causing the user interaction system 2000 to perform a method of electronic fault detection method comprising writing a first register from a first software portion, writing a second register from a second software portion, detecting that both the first and second register have been written, verifying a relationship between first data written to the first register and second data written to the second register, signaling a fault upon said verification failing, and signaling a fault if said verification of the comparator circuit does not occur within a time limit. The method may further determine that a first and a second computation result are close to each other.

Figure 10:
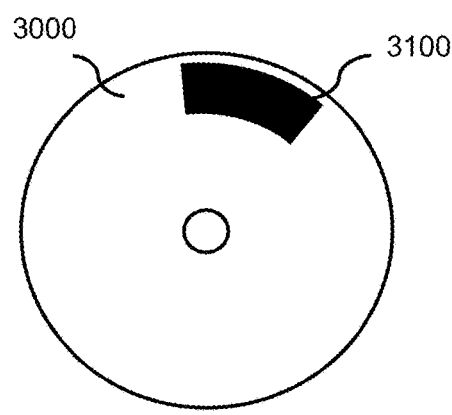
FIG. 10 shows a computer readable medium comprising a computer program product

FIG. 10 shows a computer readable medium 3000 comprising a computer program product 3100, the computer program product 3100 comprising instructions for causing the processor apparatus to perform a method of electronic fault detection. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 8 as an optical disc, the computer readable medium 3000 may be any suitable computer readable medium, such as a hard disk, solid state memory, flash memory, etc., and may be non-recordable or recordable.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library, and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The semiconductor substrate described herein can be any semiconductor material or combinations of materials, such as gallium arsenide, silicon germanium, silicon-on-insulator (SOI), silicon, monocrystalline silicon, the like, and combinations of the above.

The data processing system may comprise a bus, e.g., to interconnect CPU cores, memory and one or more fault detection units. As used herein, the term "bus" is used to refer to a plurality of signals or conductors which may be used to transfer one The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

A fault detection unit may transfer signals using a conductor. Conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details have not been explained in any greater extent than that considered necessary, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Furthermore, although FIG. 1a and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 200 are circuitry located on a single integrated circuit or within a same device. Alternatively, data processing system 200 may include any number of separate integrated circuits or separate devices interconnected with each other. For example, memory 210 may be located on a same integrated circuit as cores 222 and 224 or on a separate integrated circuit or located within another peripheral or slave discretely separate from other elements of data processing system 200. Fault detection unit 230 and fault collection unit 240 may also be located on separate integrated circuits or devices. FCCU 240 may be replaced by I/O circuitry, e.g., to signal a fault to outside the integrated circuit.

Also for example, data processing system 200 or portions thereof may be soft or code representations of physical circuitry or of logical representations convertible into physical circuitry. As such, fault detection unit 100 and/or data processing system 200 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 200, for example, from computer readable media such as memory 35 or other media on other computer systems. Such computer readable media may be permanently, removably or remotely coupled to an information processing system such as data processing system 200. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 200 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An electronic fault detection unit comprising
   a first register arranged to be written from a first software portion,
   a second register arranged to be written from a second software portion,
   a comparator circuit arranged to
      detect that both the first and second register have been written,
      verify a relationship between first data written to the first register and second data written to the second register, and
      signal a fault upon said verification failing, and
   a timer circuit arranged to
      signal a fault if said verification of the comparator circuit does not occur within a time limit
      wherein the timer circuit is arranged to start timing an interval upon writing of the first or second register, the time limit is reached upon the interval expiring, so that the timer signals the fault if the other one of the first register or the second register is not written within the interval.

2. An electronic fault detection unit as in claim 1, wherein the relationship between the first data and the second data is any one of the following group:
an equality relationship, wherein the comparator circuit is arranged to verify that the first data equals the second data,
an inequality relationship, wherein the comparator circuit is arranged to verify that the first data is less than the second data,
an inequality relationship, wherein the comparator circuit is arranged to verify that the first data is more than the second data,
a closeness relationship, wherein the comparator circuit is arranged to verify that the absolute value of the first data minus the second data is less than a threshold.

3. An electronic fault detection unit, comprising
a first register arranged to be written from a first software portion,
a second register arranged to be written from a second software portion,
a comparator circuit arranged to
detect that both the first and second register have been written,
verify a relationship between first data written to the first register and second data written to the second register, and
signal a fault upon said verification failing, and
a timer circuit arranged to
signal a fault if said verification of the comparator circuit does not occur within a time limit
a configuration register arranged to configure the comparator circuit for one of multiple relationships in dependence upon configuration data written to the configuration register, the multiple relationships including at least:
an equality relationship, wherein the comparator circuit is arranged to verify that the first data equals the second data,
a first inequality relationship, wherein the comparator circuit is arranged to verify that the first data is less than the second data.

4. An electronic fault detection unit as in claim 3, wherein the timer circuit is arranged to start timing an interval upon at least one of configuration of the electronic fault detection unit or successful verification of the relationship, the time limit being reached upon the interval expiring.

5. An electronic fault detection unit as in claim 3, wherein the relationship between the first data and the second data is any one of the following:
an equality relationship, wherein the comparator circuit is arranged to verify that the first data equals the second data,
an inequality relationship, wherein the comparator circuit is arranged to verify that the first data is less than the second data,
an inequality relationship, wherein the comparator circuit is arranged to verify that the first data is more than the second data,
a closeness relationship, wherein the comparator circuit is arranged to verify that the absolute value of the first data minus the second data is less than a threshold.

6. An electronic fault detection unit as in claim 1, wherein the comparator circuit is arranged to
upon successful verification of the relationship resetting the timer circuit and return to detecting that both the first and second register have been written.

7. An electronic fault detection unit as in claim 1, wherein the comparator circuit comprises
a first electronic flag coupled to the first register, the first electronic flag being arranged to be set upon writing of the first register, and
a second electronic flag coupled to the second register, the second electronic flag being arranged to be set upon writing of the second register,
the comparator circuit being arranged to detect that both the first and second flag are set, and to reset said first flag and second flag at least upon successful verification of the relationship.

8. An electronic fault detection unit as in claim 1, wherein the electronic fault detection unit comprises a status register,
the status register being arranged to indicate at least one of a result of a previous verification of the comparator circuit, or
that one of the first and second register have been written, but not the other.

9. A data processing device comprising
a first electronic fault detection unit as in claim 1,
at least one memory storing a first and second software portion,
at least one processor arranged to execute the first software portion and the second software portion, the data processing device being arranged so that the first and second register of the fault detection unit is writeable from the first and second software portion.

10. A data processing device as in claim 9, comprising a fault collection and control unit arranged to receive the signal from the first electronic fault detection unit.

11. A data processing device as in claim 9, wherein
the first software portion comprising
one or more instructions arranged to perform a first computation resulting in a first computation result, and
one or more instructions arranged to write the first computation result to the first register of the first fault detection unit of the data processing device,
the second software portion comprising
one or more instructions arranged to perform a second computation resulting in a second computation result, and
one or more instructions arranged to write the second computation result to the second register of the first fault detection unit.

12. A data processing device as in claim 9, wherein
the first software portion comprising
one or more instructions arranged to perform a first computation resulting in a first computation result, and
one or more instructions arranged to write the first computation result to the first register of the first fault detection unit of the data processing device, the first fault detection unit being configured for a first inequality relationship, wherein a comparator circuit of the first fault detection unit is arranged to verify that a first data written to the first register of the first fault detection unit is less than a second data written to the second register of the first fault detection unit,
one or more instructions arranged to add a threshold value to the first computation result, and to write the result to the first register of a second fault detection unit of the data processing device, the second fault detection unit being configured for a second inequality relationship, wherein a comparator circuit of the second fault detection unit is arranged to verify that a first data written to the first register of the second fault detection unit is more than a second data written to the second register of the second fault detection unit, the second software portion comprising
one or more instructions arranged to perform a second computation resulting in a second computation result, and
one or more instructions arranged to add a threshold value to the second computation result, and to write the result to the second register of the first fault detection unit of the data processing device,
one or more instructions arranged to write the second computation result to the second register of the second fault detection unit of the data processing device, wherein
the first fault detection unit and the second fault detection unit are the same fault detection unit, or
the first fault detection unit is different from the second fault detection unit.

13. An integrated circuit comprising a multiple electronic fault detection units as in claim 1 distributed over two lakes.

14. A computer implemented fault detection method for use with a data processing device comprising a first fault detection unit and a second fault detection unit,
in a first software portion:
performing a first computation resulting in a first computation result, and
writing the first computation result to a first register of a first fault detection unit of the data processing device, the first fault detection unit being configured for a first inequality relationship, wherein a comparator circuit of the first fault detection unit is arranged to verify that a first data written to the first register of the first fault detection unit is less than a second data written to a second register of the first fault detection unit
adding a threshold value to the first computation result, and to write the result to a first register of a second fault detection unit of the data processing device, the second fault detection unit being configured for a second inequality relationship, wherein a comparator circuit of the second fault detection unit is arranged to verify that a first data written to the first register of the second fault detection unit is more than a second data written to a second register of the second fault detection unit
in a second software portion:
performing a second computation resulting in a second computation result, and
adding a threshold value to the second computation result, and to write the result to the second register of the first fault detection unit of the data processing device,
writing the second computation result to the second register of the second fault detection unit of the data processing device.

15. A non-transitory tangible computer readable storage medium comprising data loadable in a programmable data processing device, the data representing instructions executable by the programmable data processing device, said instructions comprising a first software portion and a second software portion, the first software portion comprising
one or more instructions arranged to perform a first computation resulting in a first computation result, and
one or more instructions arranged to write the first computation result to a first register of a first fault detection unit of the data processing device, the first fault detection unit being configured for a first inequality relationship, wherein a comparator circuit of the first fault detection unit is arranged to verify that a first data written to the first register of the first fault detection unit is less than a second data written to the second register of the first fault detection unit
one or more instructions arranged to add a threshold value to the first computation result, and to write the result to a first register of a second fault detection unit of the data processing device, the second fault detection unit being configured for a second inequality relationship, wherein a comparator circuit of the second fault detection unit is arranged to verify that a first data written to the first register of the second fault detection unit is more than a second data written to the second register of the second fault detection unit the second software portion comprising
one or more instructions arranged to perform a second computation resulting in a second computation result, and
one or more instructions arranged to add a threshold value to the second computation result, and to write the result to the second register of the first fault detection unit of the data processing device,
one or more instructions arranged to write the second computation result to the second register of the second fault detection unit of the data processing device.

16. An electronic fault detection unit as in claim 3, wherein the comparator circuit is arranged to
upon successful verification of the relationship resetting the timer circuit and return to detecting that both the first and second register have been written.

17. An electronic fault detection unit as in claim 3, wherein the comparator circuit comprises
a first electronic flag coupled to the first register, the first electronic flag being arranged to be set upon writing of the first register, and
a second electronic flag coupled to the second register, the second electronic flag being arranged to be set upon writing of the second register,
the comparator circuit being arranged to detect that both the first and second flag are set, and to reset said first flag and second flag at least upon successful verification of the relationship.

18. An electronic fault detection unit as in claim 3, wherein the electronic fault detection unit comprises a status register,
the status register being arranged to indicate at least one of a result of a previous verification of the comparator circuit, or that one of the first and second register have been written, but not the other.

19. A data processing device comprising
a first electronic fault detection unit as in claim 3,
at least one memory storing a first and second software portion,
at least one processor arranged to execute the first software portion and the second software portion, the data processing device being arranged so that the first and second register of the fault detection unit is writeable from the first and second software portion.

20. A data processing device as in claim 19, wherein the first software portion comprising one or more instructions arranged to perform a first computation resulting in a first computation result, and one or more instructions arranged to write the first computation result to the first register of the first electronic fault detection unit of the data processing device, the first fault detection unit being configured for a first inequality relationship, wherein a comparator circuit of the first fault detection unit is arranged to verify that a first data written to the first register is less than a second data written to the second register, one or more instructions arranged to add a threshold value to the first computation result, and to write the result to the first register of a second fault detection unit of the data processing device, the second fault detection unit being configured for a second inequality relationship, wherein a comparator circuit of the second fault detection unit is arranged to verify that a first data written to the first register is more than a second data written to the second register, the second software portion comprising one or more instructions arranged to perform a second computation resulting in a second computation result, and one or more instructions arranged to add a threshold value to the second computation result, and to write the result to the second register of the first electronic fault detection unit of the data processing device, one or more instructions arranged to write the second computation result to the second register of the second fault detection unit of the data processing device, wherein the first fault detection unit and the second fault detection unit are the same fault detection unit, or the first fault detection unit is different from the second fault detection unit.

\* \* \* \* \*